United States Patent [19]
Fukuda

[11] Patent Number: 5,986,587
[45] Date of Patent: Nov. 16, 1999

[54] REDUNDANT BINARY CODE CONVERTING CIRCUIT AND MULTIPLICATION CIRCUIT USING SAME

[75] Inventor: Hideaki Fukuda, Kawasaki, Japan

[73] Assignee: Fujitsu Limited, Kawasaki, Japan

[21] Appl. No.: 09/069,144

[22] Filed: Apr. 29, 1998

[30] Foreign Application Priority Data

May 2, 1997 [JP] Japan ..................................... 9-114861

[51] Int. Cl.$^6$ .............................. G06F 7/52; H03M 5/16
[52] U.S. Cl. ......................... 341/57; 341/56; 364/760.01
[58] Field of Search ................................ 341/50, 56, 57, 341/63, 102, 103; 364/760.01, 754.01, 736.01

[56] References Cited

U.S. PATENT DOCUMENTS

| | | | |
|---|---|---|---|
| 5,172,380 | 12/1992 | Odaka | 371/37 |
| 5,473,559 | 12/1995 | Makino | 364/758 |
| 5,570,309 | 10/1996 | Miyoshi et al. | 364/746.2 |
| 5,636,155 | 6/1997 | Kabuo | 364/760 |
| 5,907,499 | 5/1999 | Suzuki | 364/764 |

FOREIGN PATENT DOCUMENTS 05004964  1/1993  Japan .

*Primary Examiner*—Brian Young
*Assistant Examiner*—Peguy JeanPierre
*Attorney, Agent, or Firm*—Staas & Halsey

[57] ABSTRACT

A redundant binary code conversion circuit consists of first to third RBC conversion circuits 261 to 263. The circuit 261 consists of decoders 30 to 38 of the same construction, the circuit 262 consists of RBC 2-digit conversion circuits 40 to 47 of the same construction and the circuit 263 consists of decoders 50 to 58 of the same construction. The circuit 261, as an exception, converts RBC patterns '...TT011...'('T' is −1), '...110TT...', '...TT1...' and '...11T...' of n digits to RBC patterns '...T10T0T...', '...1T0101...', '...T10T...' and '...1T01...' of (n+1) digits, respectively, circuit 262 converts RBC patterns '...1T...' and '...T1...' to RBC patterns '...01...' and '...0T...', respectively, and circuit 263 converts RBC patterns '...10TT...' and '...T011...' to RBC patterns '...0101...' and '...0T0T...', respectively.

13 Claims, 11 Drawing Sheets

REDUNDANT BINARY CODE CONVERTING CIRCUIT AND MULTIPLICATION CIRCUIT USING SAME

BACKGROUND OF THE INVENTION

1. Field of the Invention

The present invention relates to a redundant binary code conversion circuit and a multiplication circuit in which the same is used.

2. Description of the Related Art

FIG. 11 shows a brief configuration of a prior art multiplication circuit.

It is assumed that a multiplicand and multiplier are a positive integer of n bits. Furthermore, it is assumed that each of register 10 and higher-order bit part 11H and lower-order bit part 11L of shift register 11 is of n bits. In the drawing, C is a count of counter 13 and CO is a carry output from adder circuit 14. The following processes are carried out by control circuit 12.

(1) A multiplicand is loaded in register 10, a multiplier is loaded in lower-order bit part 11L of shift register 11, and higher-order bit part 11H of shift register 11 is cleared to be zero. Initial-value n is loaded in counter 13.

(2) With CO provided in the MSB of shift register 11, shift register 11 is shifted by one bit in the direction of the arrow.

(3) If the shifted output bit from the LSB of shift register 11 is '1', (Higher-order bit part 11H)←(Higher-order bit part 11H)+(Register 10), and if the bit is '0', the process is skipped.

(4) C←C−1

(5) If C=0, the process ends, and if C≠0, the process returns to step (2).

Although the construction of this multiplication circuit is simple, the calculation time is lengthened since addition and shift processes are repeatedly carried out. This problem will become remarkable with an increase of the number of digits, wherein the process rate such as DSP equipped with a multiplication circuit is greatly influenced by the calculation rate of the multiplication circuit. Especially, in DSP which is used for a portable telephone, image processing device, etc., a fast process is requested.

From the above-mentioned (3), the more the number of zeros which are included in multiplier becomes, the more the time of multiplication is decreased.

On the other hand, according to RBC (redundant binary code) of ternary code, it can be converted to a code of the same value including more zeros by utilizing its redundancy. The RBC n digits of a number Z is $$z = \sum_{i=0}^{n-1} \alpha_{i2}^i$$

where $\alpha_i \in \{1, 0, -1\}$ and this number Z is expressed in vector notation as $$Z = `\alpha n-1 \alpha n-2 ... \alpha 2 \alpha 1 \alpha 0'.$$

Usual binary codes are included in RBCs of ternary code. For example, RBC '01111111' can be converted to RBC '01000000T', where T represents −1. A×'1000000T' needs only the calculation of the above step (3) only two times while A×'01111111' needs calculations of the step (3) seven times.

Therefore, in FIG. 11, an RBC multiplier is loaded in register 15, the multiplier is converted in RBC conversion circuit 16 to increase the number of zeros, and the same is loaded in the lower-order bit part 11L of shift register 11. The process in RBC conversion circuit 16 can be carried out in parallel with the previous multiplication.

In such an RBC multiplication circuit, the output of RBC conversion circuit 16, the lower-order bit part 11L and higher-order bit part 11H are of n digits of RBC. Further, registers 10 and 15 are of n digits of RBC, and adder-subtracter circuit 14 is for addition or subtraction between a RBC n digits and another RBC n digits.

In the prior art, code conversion is carried out by RBC conversion circuit 16 on the basis of the following truth TABLE I.

TABLE I

| | INPUT | | | | OUTPUT |
|---|---|---|---|---|---|
| No. | $X_{i+1}$ | $X_i$ | $X_{i-1}$ | $X_{i-2}$ | $Y_i$ |
| 1 | | $\bar{1}$ | $\bar{1}$ | | 0 |
| 2 | $\bar{1}$or1 | $\bar{1}$ | 0 | | 1 |
| 3 | | $\bar{1}$ | 1 | | 0 |
| 4 | | 0 | $\bar{1}$ | $\bar{1}$ | $\bar{1}$ |
| 5 | | 0 | 1 | 1 | 1 |
| 6 | | 1 | $\bar{1}$ | | 0 |
| 7 | $\bar{1}$or1 | 1 | 0 | | $\bar{1}$ |
| 8 | | 1 | 1 | | 0 |

Values at the blank on TABLE I are don't care. Furthermore, 1 with a top bar is equal to −1 (T̄), and rows No. 1 through No. 4 are complementary with rows No. 8 through 5, respectively.

Generally converted value Yi of the ith digit is defined by pre-conversion values Xi+1 through Xi−2 of the (i−1)th through (i−2)th digits. For example, 'X4X3X2X1X0'-'01111' coverted to 'Y4Y3Y2Y1Y0' as described below with Xj=0 for j=−2, −1 and 5 which do not exist.

For i=0 as input is '1100', row No. 7 in Table is applied, then Y0='T̄'.

For i=1; as input is '1110', row No. 8 in Table is applied, then Y1='0'.

For i=2; as input is '1111', row No. 8 in Table is applied, then Y2='0'.

For i=3; as input is '0111', row No. 8 in Table is applied, then Y3='0'.

For i=4; as input is '0011', row No. 5 in Table is applied, then Y4='1'.

Thus, RBC '01111' is converted to RBC '1000T̄'. These processes of i=0 through 4 can be carried out in parallel to one another.

However, the number m of zeros included in the converted RBC differs in compliance with the numerals of pre-conversion, and in design, the slowest multiplication speed with m at the minimum must be used. This problem will become remarkable with an increase of the digit number according to a high performance tendency of DSP, etc. in which a multiplication circuit is used.

SUMMARY OF THE INVENTION

In view of these problems, it is therefore an object of the present invention to provide a redundant binary code conversion circuit, which is able to increase the number of '0' digits included in a converted redundant binary code, and a multiplication circuit using the same.

In the 1st aspect of the present invention, there is provided a redundant binary code conversion circuit for converting a redundant binary code of n digits to a redundant binary code of (n+1) digits without changing a value thereof, comprising: a first code conversion circuit for converting a first redundant binary code 'Xn−1Xn−2...X2X1X0' of n digits to a second redundant binary code 'YnYn−1...Y2Y1Y0' of (n+1) digits according to a rule that value Yi of ith digit of the second redundant binary code is defined based on values Xi+1, Xi, Xi−1 and Xi−2 of (i+1)th to (i−1)th digits of the first redundant binary code and according to an exception of the rule that patterns '...TT011...' and '...110TT...' are changed to patterns '...T10T0T...' and '...1T0101...', respectively, 'T' being a digit of −1; and a second code conversion circuit for converting the second redundant binary code of (n+1) digits to a third redundant binary code of (n+1) digits so that patterns '...1T...' and '...T1...' are changed to patterns '...01...' and '...0T...', respectively.

With the 1st aspect of the present invention, since a detailed exceptional patterns having a comparatively small number of digit '0' is taken into consideration and the pattern is converted in two stages so that the number of digit '0' is increased, it is possible to decrease the number of digit '0' of a converted redundant binary code. This contributes to higher speed operation of a multiplication circuit.

In the 2nd aspect of the present invention, there is provided a redundant binary code conversion circuit as defined in the 1st aspect, wherein the rule in the first code conversion circuit, with using a formula f(Xi+1, Xi, Xi−1, Xi−2)=Yi, have relations of: f(DC, 'T', 'T', DC)='0'; f(NZ, 'T', '0', DC)='1'; f(DC, 'T', '1', DC)='0'; f(DC, '0', 'T', 'T')='T'; f(DC, '0', '1', '1')='1'; f(DC, '1', 'T', DC)='0'; f(NZ, '1', '0', DC)='T'; f(DC, '1', '1', DC)='0'; and in other case Xi=Yi, wherein value DC is don't care, value NZ is nonzero and Xj=0 for j≧n or j<0.

In the 3rd aspect of the present invention, there is provided a redundant binary code conversion circuit as defined in the 2nd aspect, wherein, as other exception of the rule in the first code conversion circuit, patterns '...TT1...' and '...11T...' are changed to patterns '...T10T...' and '...1T01...', respectively.

With the 3rd aspect of the present invention, since another detailed exceptional patterns having a comparatively small number of digit '0' is taken into consideration and an input pattern is converted in two stages so that the number of digit '0' is increased, it is possible to further decrease the number of digit '0' of a converted redundant binary code.

In the 4th aspect of the present invention, there is provided a redundant binary code conversion circuit as defined in the 3rd aspect, wherein the rule and the exception in the first code conversion circuit, with using a formula f(Xi+2, Xi+1, Xi, Xi−1, Xi−2, Xi−3, Xi−4)=Yi, have unified relations of: f(DC, DC, 'T', 'T', 'T', DC, DC)='0'; f(DC, DC, 'T', 'T', '0', DC, DC)='0'; f(DC, DC, 'T', 'T', '1', DC, DC)='1'; f(DC, DC, 'T', 'T', '0', '1', '1')='1'; f(DC, 'T', 'T', '0', DC, DC, DC)='1'; f(DC, '1', 'T', 101 , DC, DC, DC)='1'; f(DC, 'T', 'T', '0', '1', '1', DC)='0'; f(DC, DC, 'T', '1', '0', DC, DC)='0'; f(DC, DC, 'T', '1', '1', DC, DC)='0'; f(DC, 'T', 'T', '1', 'T', DC, DC)='T'; f(DC, DC, '0', 'T', 'T', DC, DC)='T'; f('1', '1', '1', '0', 'T', 'T', DC, DC)='1'; f('T', 'T', '0', '1', '1', DC, DC)='T'; f(DC, DC, '0', '1', '1', DC, DC)='1'; f(DC, '1', '1', 'T', '1', DC, DC)='1'; f(DC, DC, '1', 'T', 'T', DC, DC)='0'; f(DC, DC, '1', '1', '0', 'T', 'T', DC, DC)='0'; f(DC, 'T', '1', '0', DC, DC, DC)='T'; f(DC, '1', '1', '0', DC, DC, DC)='T'; f(DC, DC, '1', '1', '0', 'T', 'T')='T'; f(DC, DC, '1', '1', 'T', DC, DC)='T'; f(DC, DC, '1', '1', '0', DC, DC)='0'; f(DC, DC, '1', '1', '1', DC, DC)='0'; and in other case Xi=Yi, wherein, when there are a plurality of matches, a relation having a smaller number of DC is applied, and Xj=0 for j≧n or j<0.

With the 4th aspect of the present invention, the above-mentioned rule and its exception are uniformly handled.

In the 5th aspect of the present invention, there is provided a redundant binary code conversion circuit as defined in the 4th aspect, wherein the first code conversion circuit comprises decoder circuits, and wherein each of the decoder circuits meets the unified relations and corresponds to one of i=0 through n.

With the 5th aspect of the present invention, since decoder circuits of the same configuration can be used, the construction can be simplified.

In the 6th aspect of the present invention, there is provided a redundant binary code conversion circuit as defined in the 5th aspect, wherein the second code conversion circuit comprises RBC two-digit conversion circuits of n/2 in number, and wherein each of the RBC two-digit conversion circuits receives two adjacent digits of the 'YnYn−1...Y2Y1Y0' and converts patterns '1T', 'T1' and others to patterns '01', '0T' and the same, respectively.

With the 6th aspect of the present invention, since RBC two-digit conversion circuits having the same configuration can be used, the construction can be simplified.

In the 7th aspect of the present invention, there is provided a redundant binary code conversion circuit as defined in the 6th aspect, wherein the second binary code conversion circuit further comprises a RBC two-digit conversion circuit which receives outputs of adjacent two of the RBC two-digit conversion circuits and converts patterns '1T', 'T1' and others to patterns '01', '0T' and the same, respectively .

With the 7th aspect of the present invention, the number of digit '0' after code conversion can be further decreased than the 6th aspect.

In the 8th aspect of the present invention, there is provided a redundant binary code conversion circuit as defined in the 7th aspect, further comprising a third code conversion circuit for converting the second redundant binary code to a third redundant binary code of (n+1) digits so that patterns '...10TT...' and '...T011...' are changed to patterns '...0101...' and '...0T0T...', respectively.

With the 8th aspect of the present invention, since a detailed exceptional pattern having a comparatively small number of digit '0' is further taken into consideration, the number of digit '0' of a redundant binary code after the final code conversion becomes smaller.

In the 9th aspect of the present invention, there is provided a redundant binary code conversion circuit as defined in the 8th aspect, wherein the third code conversion circuits converts the second redundant binary code 'QnQn−1...Q2Q1Q0' to the third redundant binary codes 'ZnZn−1...Z2Z1Z0' according to a rule that, with using a formula g(Qi+3, Qi+2, Qi+1, Qi, Qi−1, Qi−2, Qi−3)=Zi, ith digit Zi of the third redundant binary code is defined by the Q/Z relations of: g('T', '0', '1', '1', DC, DC, DC)='T'; g(DC, 'T', '0', '1', '1', DC, DC)='0'; g(DC, DC, 'T', '0', '1', '1', DC)='T'; g(DC, DC, DC, 'T', '0', '1', '1')='0'; g(DC, DC, DC, '1', '0', 'T', 'T')='0'; g(DC, DC, '1', '0', 'T', 'T', DC)='1'; g(DC, '1 ', '0', 'T', 'T', DC, DC)='0'; g('1', '0', 'T', 'T', DC, DC, DC)='1'; and in other case Qi=Zi, wherein Qj=0 for j≧n or j<0.

In the 10th aspect of the present invention, there is provided a redundant binary code conversion circuit as defined in the 9th aspect, wherein the third code conversion circuit comprises Q/Z decoder circuits for each of i=1 through n, and wherein each of the Q/Z decoder circuits meets the Q/Z relations.

With the 10th aspect of the present invention, since decoder circuits of the same configuration can be used, the construction can be simplified.

In the 11th aspect of the present invention, there is provided a redundant binary code conversion circuit as defined in the 5th aspect, wherein the decoder circuit comprises: a first group pattern detecting circuit for detecting a match between an input pattern and one of first group patterns; a second group pattern detecting circuit for detecting a match between the input pattern and one of second group patterns which don't overlap with the first group patterns; and an output selecting circuit for outputting a value corresponding to an output of the second group pattern detecting circuit when the match is detected by the first or second group pattern detecting circuit, and for outputting a value of an input digit corresponding to an output digit when the match is not detected.

With the 11th aspect of the present invention, when a match is detected by the 1st group pattern detecting circuit, the output value of the 2nd group pattern detecting circuits can be made constant regardless of whether the output of the 1st group pattern detecting circuit is '1' or 'T', thereby it is possible to construct the 1st group pattern detecting circuits without taking into consideration whether the output value of the 1st group pattern detecting circuits is '1' or 'T'. Therefore, the circuit design can be simplified.

In the 12th aspect of the present invention, there is provided a redundant binary code multiplication circuit comprising: a redundant binary code conversion circuit for converting a redundant binary code multiplier of n digits to a redundant binary code multiplier of (n+1) digits without changing a value thereof; and a circuit for calculating a total sum of partial products each of which corresponds to a nonzero digit of the redundant binary code multiplier of (n+1) digits, wherein the redundant binary code conversion circuit comprising: a first code conversion circuit for converting a first redundant binary code 'Xn–1Xn–2...X2X1X0' of n digits to a second redundant binary code 'YnYn–1...Y2Y1Y0' of (n+1) digits according to a rule that, value $Y_i$ of ith digit of the second redundant binary code is defined based on values $X_{i+1}$, $X_i$, $X_{i-1}$ and $X_{i-2}$ of (i+1)th to (i-1)th digits of the first redundant binary code and according to an exception of the rule that patterns '...TT011...' and '...110TT...' are changed to patterns '...T10T0T...' and '...1T0101...', respectively, 'T' being a digit of –1; and a second code conversion circuit for converting the second redundant binary code of (n+1) digits to a third redundant binary code of (n+1) digits so that patterns '...1T...' and '...T1...' are changed to patterns '...01...' and '...0T...', respectively.

With the 13th aspect of the present invention, since the number of digit '0' of a multiplier can be further increased than ever by code conversion, a higher speed calculation can be performed.

Other aspects, objects, and the advantages of the present invention will become apparent from the following detailed description taken in connection with the accompanying drawings.

DESCRIPTION OF THE PREFERRED EMBODIMENT

Figure 1:
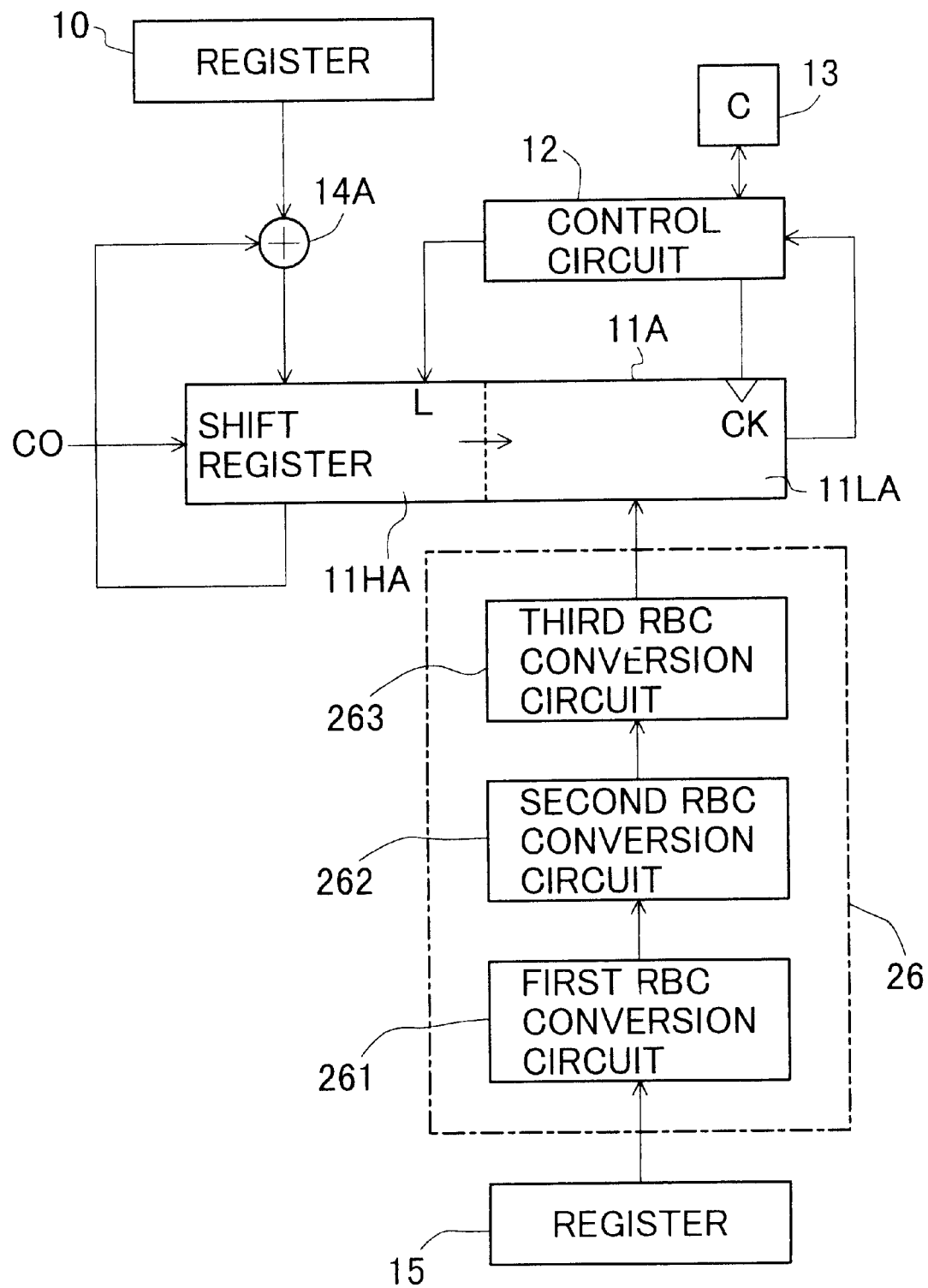
FIG. 1 is a block diagram showing a brief configuration of RBC multiplication circuit according to an embodiment of the present invention.

Referring now to the drawings, wherein like reference characters designate like or corresponding parts throughout several views, preferred embodiment of the present invention is described below.

Since there are patterns each of which has only one pattern such as RBC '11111111', there are cases where the pattern becomes the same even if converted on the basis of above truth TABLE I as long as RBC of n digits is converted to RBC of n digits. Therefore, for example, RBC '11111111' is converted to RBC '10000000T' by converting RBC of n digits to RBC of (n+1) digits. This pattern conversion itself is well-known but the present invention is characterized in that the number of digits is increased by one in calculation of n digit numbers.

Even if the number of digit is increased by one and it is converted on the basis of TABLE I, there exists two kinds of patterns where the total number of '1' or 'T' remains unchanged in comparison with pre-conversion. These are called hereinafter the first and second problem patterns.

(1) First problem patterns

The first problem patterns are '...TT011...' and '...110TT...' each of which has more than two successive digits of '1' or 'T' at both sides of digit '0'. If these patterns are converted on the basis of TABLE I, they will become '...T0110T...' and '...10TT01...', respectively and '0' is increased by one. However, since the number of digits is increased by one through the code conversion, the total number of '1' or 'T' remains unchanged by the code conversion.

(2) Second problem patterns

The second problem patterns are '...TT1...' and '...11T...', and if these patterns are converted on the basis of TABLE I, they will become '...T011...' and '...10TT...1', respectively, wherein the total number of '1' or 'T' remains unchanged by the code conversion.

In the present invention, the first and second problem patterns are converted in two stages as described below and thereby the number of '0' digits is increased.

In the first stage, as an exception of TABLE I, the patterns are converted as follows:

```
'...TT011...'    →    '...T10T0T...'    (A)
'...110TT...'    →    '...1T0101...'    (B)
'...TT1...'      →    '...T10T...'      (C)
'...11T...'      →    '...1T01...'      (D)
```

Since '1T'='01' and 'T1'='0T', in the second stage, the patterns (A) to (D) are converted as follows, respectively:

```
'...T10T0T...'   →    '...0T0T0T...'
'...1T0101...'   →    '...010101...'
'...T10T...'     →    '...0T0T...'
'...1T01...'     →    '...0101...'
```

Through the above process, the number of '0' included in RBC after the code conversion becomes n/2 or more, excepting the following exceptional cases, when the RBC is n digits before the code conversion.

It is found that after converting the exceptional cases the RBC includes '10TT' or 'T011' without fail.

Therefore, in the third stage, the patterns are further converted as follows:

'10TT'→'0101'

'T011'→'0T0T'

According to the result of the above-mentioned code conversion from the first stage to the third stage by using a computer, it was confirmed that the number of digit '0' becomes n/2 or more in each pattern without fail.

The code conversion of the above-mentioned first stage can be carried out by using the following truth TABLE II.

for carrying out the above-mentioned code conversion (A), row Nos. 42, 71 and 81 are for carrying out the above-mentioned code conversion (B), row Nos. 13 and 33 are for the above-mentioned code conversion (C), and row Nos. 61 and 82 are for the above-mentioned code conversion (D). Row Nos. 11 through 14 are extension of row No. 1 on TABLE I, row Nos. 21 through 23 are extension of row No. 2 on TABLE I, and row Nos. 31 through 33 are extensions of row No. 3 on TABLE I. Row Nos. 41 and 42 are extensions of row No. 4 on TABLE I, and row No. 42 (*C1) is applied with higher priority than row No. 41 (*C2). Furthermore, row Nos. 51 and 52 are extensions of row No. 5 on TABLE I, row Nos. 61 through 63 are extensions of row No. 6 on TABLE I, row Nos. 71 through 73 are extensions of row No. 7 on TABLE I, and row Nos. 81 through 84 are extensions of row No. 8 on TABLE I.

The priority on TABLE II is such that a more detailed pattern is applied with higher priority if there are a plurality of patterns which are matched with the input pattern. For example, in a case where the input pattern is matched with both row No. 12(*A2) and row No. 14(*A1), row No. 14 is applied, and in a case where the input pattern is matched with both row No. 21(*B2) and row No. 23(*B1), row No. 23 is applied.

Generally, converted value $Y_i$ of the ith digit is defined by pre-conversion value $X_{i+2}$ to $X_{i-4}$ of the (i+2)th to (i-1)th digits. When no corresponding (i+2)th digit, (i+1)th digit or (i-4)th to (i-4)th digit exists, '0' is substituted therein.

For example, as to '$X_4X_3X_2X_1X_0$'='TT011' which is one of the inputs of the above-mentioned code conversion (A), $X_j=0$ for j=−4 to −1, 5 and 6, and the same is converted to '$Y_5Y_4Y_3Y_2Y_1Y_0$' as described below:

For i=0; as input is '0110000', row No. 73 on TABLE II is applied, then $Y_0$='T'.

TABLE II

| No. | $X_{i+2}$ | $X_{i+1}$ | $X_i$ | $X_{i-1}$ | $X_{i-2}$ | $X_{i-3}$ | $X_{i-4}$ | PRIORITY | OUTPUT | SPEC CNV |
|---|---|---|---|---|---|---|---|---|---|---|
| 11 | | | $\bar{1}$ | $\bar{1}$ | $\bar{1}$ | | | | 0 | |
| 12 | | | $\bar{1}$ | $\bar{1}$ | 0 | | | *A2 | 0 | |
| 13 | | | $\bar{1}$ | $\bar{1}$ | 1 | | | | 1 | C |
| 14 | | | $\bar{1}$ | $\bar{1}$ | 0 | 1 | 1 | *A1 | 1 | A |
| 21 | | $\bar{1}$ | $\bar{1}$ | 0 | | | | *B2 | 1 | |
| 22 | | 1 | $\bar{1}$ | 0 | | | | | 1 | |
| 23 | | $\bar{1}$ | $\bar{1}$ | 0 | 1 | 1 | | *B1 | 0 | A |
| 31 | | | $\bar{1}$ | 1 | 0 | | | | 0 | |
| 32 | | | $\bar{1}$ | 1 | 1 | | | | 0 | |
| 33 | | $\bar{1}$ | $\bar{1}$ | 1 | $\bar{1}$ | | | | $\bar{1}$ | C |
| 41 | | | 0 | $\bar{1}$ | $\bar{1}$ | | | *C2 | $\bar{1}$ | |
| 42 | 1 | 1 | 0 | $\bar{1}$ | $\bar{1}$ | | | *C1 | 1 | B |
| 51 | $\bar{1}$ | $\bar{1}$ | 0 | 1 | 1 | | | *D1 | $\bar{1}$ | A |
| 52 | | 0 | 1 | 1 | | | | *D2 | 1 | |
| 61 | | 1 | 1 | $\bar{1}$ | 1 | | | | 1 | D |
| 62 | | 1 | 1 | $\bar{1}$ | $\bar{1}$ | | | | 0 | |
| 63 | | 1 | $\bar{1}$ | 0 | | | | | 0 | |
| 71 | 1 | 1 | 0 | $\bar{1}$ | $\bar{1}$ | | | *E1 | 0 | B |
| 72 | $\bar{1}$ | 1 | 0 | | | | | | $\bar{1}$ | |
| 73 | 1 | 1 | 0 | | | | | *E2 | $\bar{1}$ | |
| 81 | | 1 | 1 | 0 | $\bar{1}$ | $\bar{1}$ | | *F1 | $\bar{1}$ | B |
| 82 | | 1 | 1 | $\bar{1}$ | | | | | $\bar{1}$ | D |
| 83 | | 1 | 1 | 0 | | | | *F2 | 0 | |
| 84 | | 1 | 1 | 1 | | | | | 0 | |

The values at the blanks on TABLE II are don't care. The rows from No. 11 to No. 42 on TABLE II are complementary with the rows from No. 84 to No. 41 therein.

This table is an extension of above truth TABLE I by adding the above-mentioned exceptional conversions (special conversions) thereto. Row Nos. 14, 23 and 51 are For i=1; as input is 'T011000', row No. 83 on TABLE II is applied, then $Y_1$ ='0'.

For i=2; as input is 'TT01100', row No. 51 on TABLE II is applied, then $Y_2$ ='T'.

For i=3; as input is '1TT0110' row No. 23 on TABLE II is applied, then $Y_3$ ='0'.

For i=4; as input is '00TT011' row No. 14 on TABLE II is applied, then Y4 ='1'.

For i=5; as input is '000TT01' row No. 41 on TABLE II is applied, then Y5 ='T'.

Thus, pattern 'TT011' is converted to pattern 'T10T0T' with one digit increased. These processes of i=0 through 5 can be carried out in parallel to one another.

The above-mentioned second stage is carried out as follows:

(1) With dividing the input code two digits by two digits from the highest digit, if '1T' exists, the same is converted to '01', and if 'T1' exists, the same is converted to '0T'.

(2) Next, with dividing the input code two digits by two digits from the second digit of higher order, the same conversion as above is carried out.

For example, input '1T0T10' is firstly divided to be '1T/0T/10', and the same is converted to '010T10'. Next, this is divided to be '0/10/T1/0', the same is converted to '0100T0'. The above (1) and (2) may be applied in reverse order.

The above-mentioned third stage may be carried out by using the following truth TABLE III.

TABLE III

| No. | $Q_{i+3}$ | $Q_{i+2}$ | $Q_{i+1}$ | $Q_i$ | $Q_{i-1}$ | $Q_{i-2}$ | $Q_{i-3}$ | $Z_i$ |
|---|---|---|---|---|---|---|---|---|
| 1 | $\bar{1}$ | 0 | 1 | 1 | | | | $\bar{1}$ |
| 2 | | $\bar{1}$ | 0 | 1 | 1 | | | 0 |
| 3 | | | $\bar{1}$ | 0 | 1 | 1 | | $\bar{1}$ |
| 4 | | | | $\bar{1}$ | 0 | 1 | 1 | 0 |
| 5 | | | | 1 | 0 | $\bar{1}$ | $\bar{1}$ | 0 |
| 6 | | | 1 | 0 | $\bar{1}$ | $\bar{1}$ | | 1 |
| 7 | | 1 | 0 | $\bar{1}$ | $\bar{1}$ | | | 0 |
| 8 | 1 | 0 | $\bar{1}$ | $\bar{1}$ | | | | 1 |

The meaning of TABLE III is the same as that of TABLE II. Rows from No. 1 to No. 4 on TABLE III are complementary with rows from No. 8 to No.5, respectively.

For example, as to input 'Q4Q3Q2Q1Q0'='010TT', Qj=0 for j=−3 to −1 and 5 to 6 which do not exist, the same is converted to 'Z5Z4Z3Z2Z1Z0' as follows:

For i=0; as input is '10TT000', row No. 8 on TABLE III is applied, then Z0='1'

For i−1; as input is '010TT00', row No. 7 on TABLE III is applied, then Z1='0'

For i=2; as input is '0010TT0', row No. 6 on TABLE III en Z2='1'

For i=3; as input is '00010TT', row No. 5 on TABLE III en Z3='0'

For i=4; as input is '00TT011', row No. 4 on TABLE III is applied, then Z4='0'

Thus, pattern '010TT' is converted to pattern '00101'. These processes of i=0 to 5 can be carried out in parallel to one another.

Figure 11:
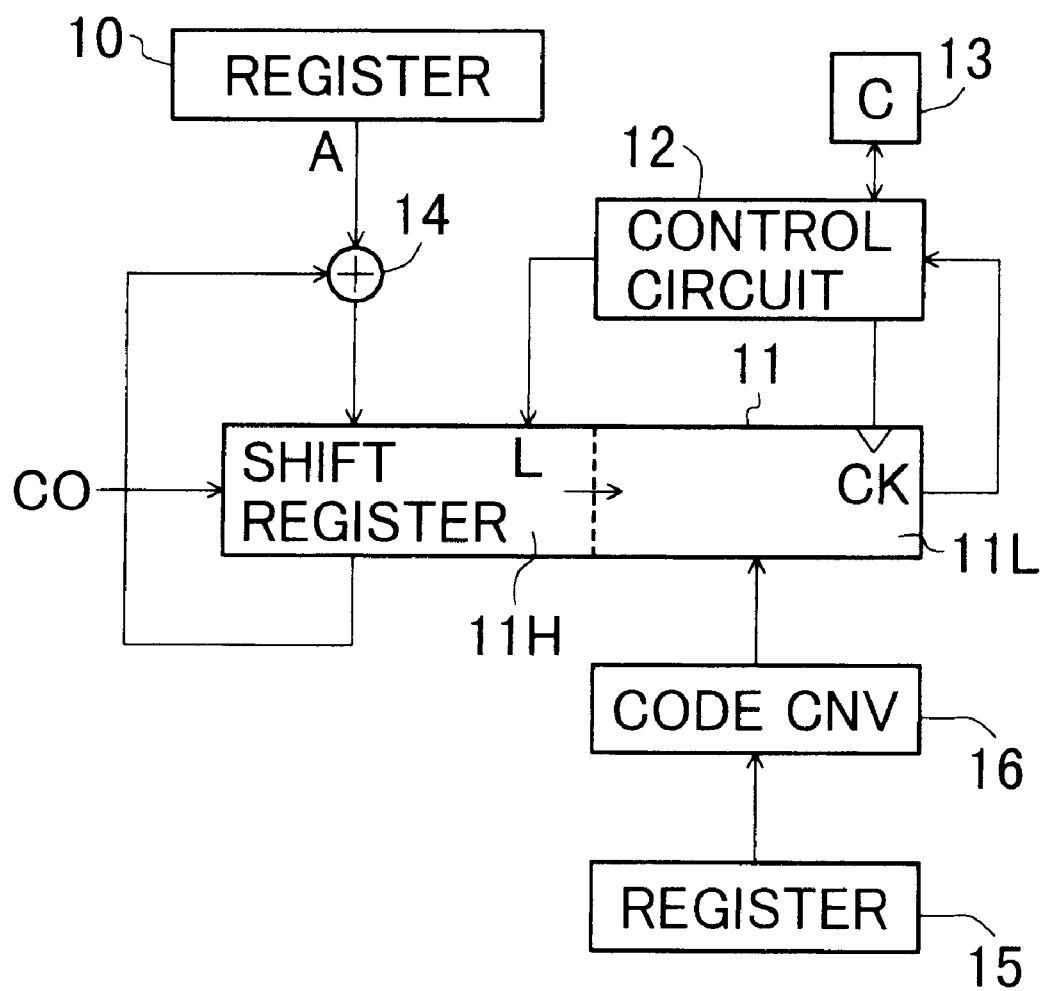
FIG. 11 is a block diagram showing a brief configuration of a prior art RBC multiplication circuit.

FIG. 1 shows a multiplication circuit in which RBC conversion circuit 26 is used instead of RBC conversion circuit 16 of the multiplication circuit in FIG. 11. The components corresponding to those of FIG. 11 are given the same or like reference characters, the explanation of which is omitted herein.

RBC conversion circuit 26 has the first to third RBC conversion circuits 261, 262, and 263 connected in cascade, which carry out code conversions of the above-mentioned first to third stages, respectively.

An RBC multiplier of n digits is loaded in register 15 and is successively converted at the first to third RBC conversion circuits 261, 262 and 263, and the result thereof is loaded in the lower-order bit part 11LA of the shift register 11A. Each of the outputs of the first to third RBC conversion circuits 261, 262, and 263 is (n+1) digits of RBC. Both the lower-order bit part 11LA and higher-order bit part 11HA of shift register 11A are of (n+1) digits of RBC. Register 10 is of n digits of RBC. Circuit 14A is an adder-subtracter circuit of (n+1) digits of RBC.

As described above, the multiplier loaded in the lower-order bit part 11LA of the shift register 11A after the conversion includes '0' at least n/2 digits, and partial sum calculations of (content of register 10)×'0' by adder-subtracter circuit 14A are skipped. The process of RBC conversion circuit 26 may be synchronous or nonsynchronous. Since as described above it is possible to carry out conversion of each digit in parallel, the process of RBC conversion circuit 26 can be carried out faster than the multiplication. Furthermore, the conversion at RBC conversion circuit 26 can be carried out in parallel with the previous multiplication. Therefore, with the multiplication circuit of FIG. 1, the faster multiplication can be performed.

Figure 2:
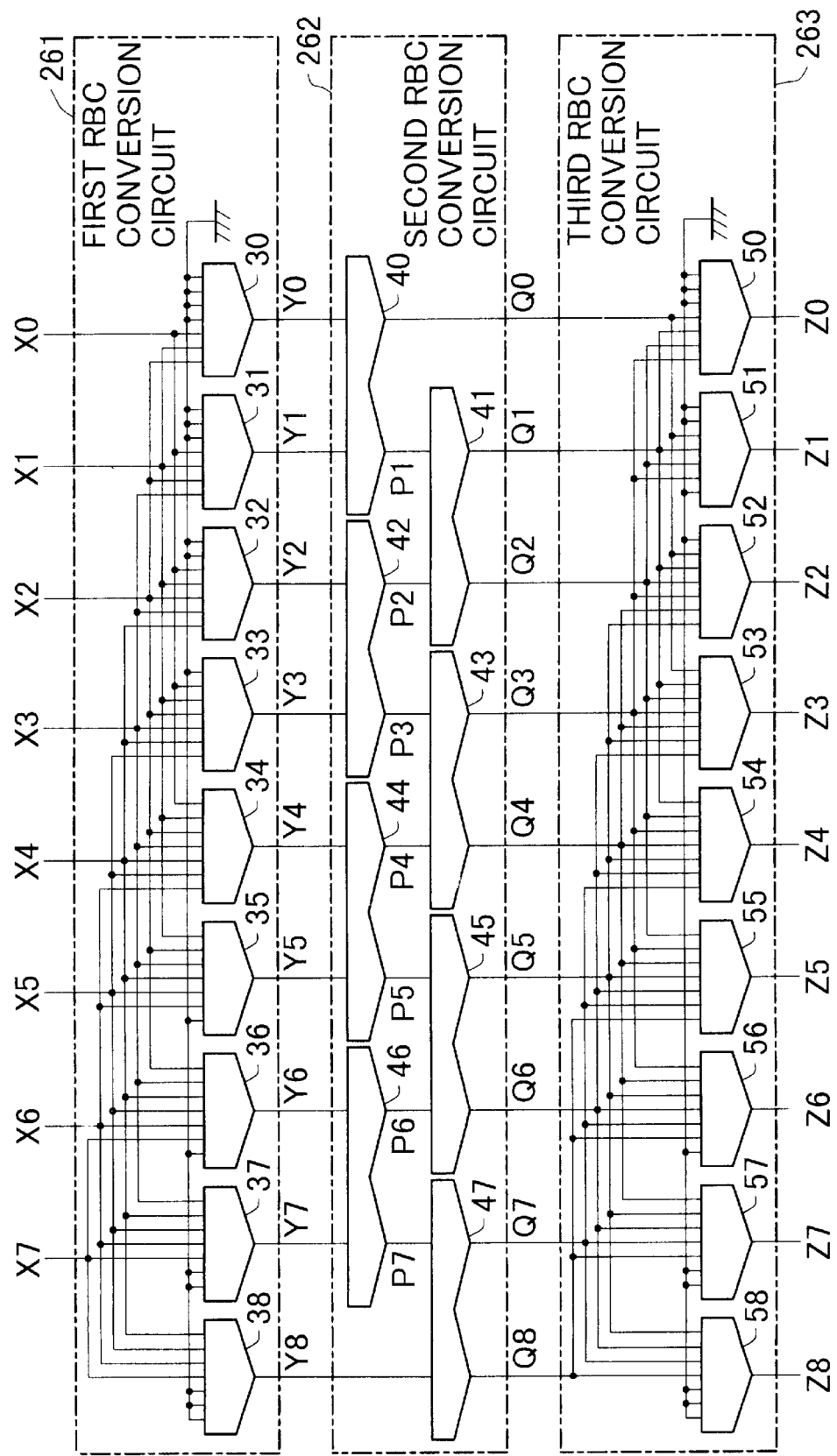
FIG. 2 is a block diagram showing a brief configuration of the RBC conversion circuit in FIG. 1.

FIG. 2 shows a block diagram of the first to third RBC conversion circuits 261 through 263 in a case of n=8. The first RBC conversion circuit 261 is provided with (n+1) decoders 30 through 38 of the same construction, which converts inputs X7 through X0 to Y8 through Y0. Each of the input and output characteristics of decoders 30 through 38 is expressed by TABLE II of truth. Each of decoders 30 through 38 is of 7 inputs and 1 output, and Y0 to Y7 are outputted from decoders 30 through 38, respectively. The inputs of decoders 30 through 38 are as follows:

The input of decoder 30 is 'X2X1X0 0 0 0 0'.

The input of decoder 31 is 'X3X2X1X0 0 0 0'.

The input of decoder 32 is 'X4X3X2X1X0 0 0'.

The input of decoder 33 is 'X5X4X3X2X1 0 0'.

The input of decoder 34 is 'X6X5X4X3X2X1 0'.

The input of decoder 35 is 'X7X6X5X4X3X2X1'.

The input of decoder 36 is ' 0X7X6X5X4X3X2'.

The input of decoder 37 is ' 0 0X7X6X5X4X3'.

The input of decoder 38 is ' 0 0 0X7X6X5X4'.

The second RBC conversion circuit 262 is provided with RBC 2-digit conversion circuits 40 through 47 of the same construction, which converts inputs Y8 through Y0 to Q8 through Q0. Each of RBC 2-digit conversion circuits 40 through 47 is of 2 inputs and 2 outputs and its conversion is performed as follows:

'1T' → '01'
'T1' → '0T'

In all the other inputs, the circuit is through state and the input value is outputted. RBC 2-digit conversion circuits 40 through 47 are grouped into the first stage RBC 2-digit conversion circuits 40, 42, 44 and 48 and the second stage RBC 2-digit conversion circuits 41, 43, 45 and 47. If symbols of FIG. 2 are used, (2 inputs)→(2 outputs) thereof are as follows:

First stage

RBC 2-digit conversion circuit 40: (Y1, Y0)→(P1, Q0)

RBC 2-digit conversion circuit 42: (Y3, Y2)→(P3, P2)

RBC 2-digit conversion circuit 44: (Y5, Y4)→(P5, P4)

RBC 2-digit conversion circuit 46: (Y7, Y6)→(P7, P6)

Second stage

RBC 2-digit conversion circuit 41: (P2, P1)→(Q2, Q1)

RBC 2-digit conversion circuit 43: (P4, P3)→(Q4, Q3)

RBC 2-digit conversion circuit 45: (P6, P5)→(Q6, Q5)

RBC 2-digit conversion circuit 47: (Y8, P7)→(Q8, Q7)

The third RBC conversion circuit 263 is provided with decoders 50 through 58 of the same construction, which convert inputs Q8 to Q0 to Z8 to Z0. Each of the input and output characteristics of circuits 50 through 58 is expressed by TABLE III. Each of decoders 50 through 58 is of 7-input and 1-output, and Z0 to Z8 are outputted from circuits 50 through 58, respectively. The inputs of decoders 50 through 58 are as follows:

The input of decoder 50 is 'Q3Q2Q1Q0 0 0 0'.

The input of decoder 51 is 'Q4Q3Q2Q1Q0 0 0'.

The input of decoder 52 is 'Q5Q4Q3Q2Q1Q0 0'.

The input of decoder 53 is 'Q6Q5Q4Q3Q2Q1 0'.

The input of decoder 54 is 'Q7Q6Q5Q4Q3Q2Q1'.

The input of decoder 55 is 'Q8Q7Q6Q5Q4Q3Q2'.

The input of decoder 56 is ' 0Q8Q7Q6Q5Q4Q3'.

The input of decoder 57 is ' 0 0Q8Q7Q6Q5Q4'.

The input of decoder 58 is ' 0 0 0Q8Q7Q6Q5'.

Figure 3:
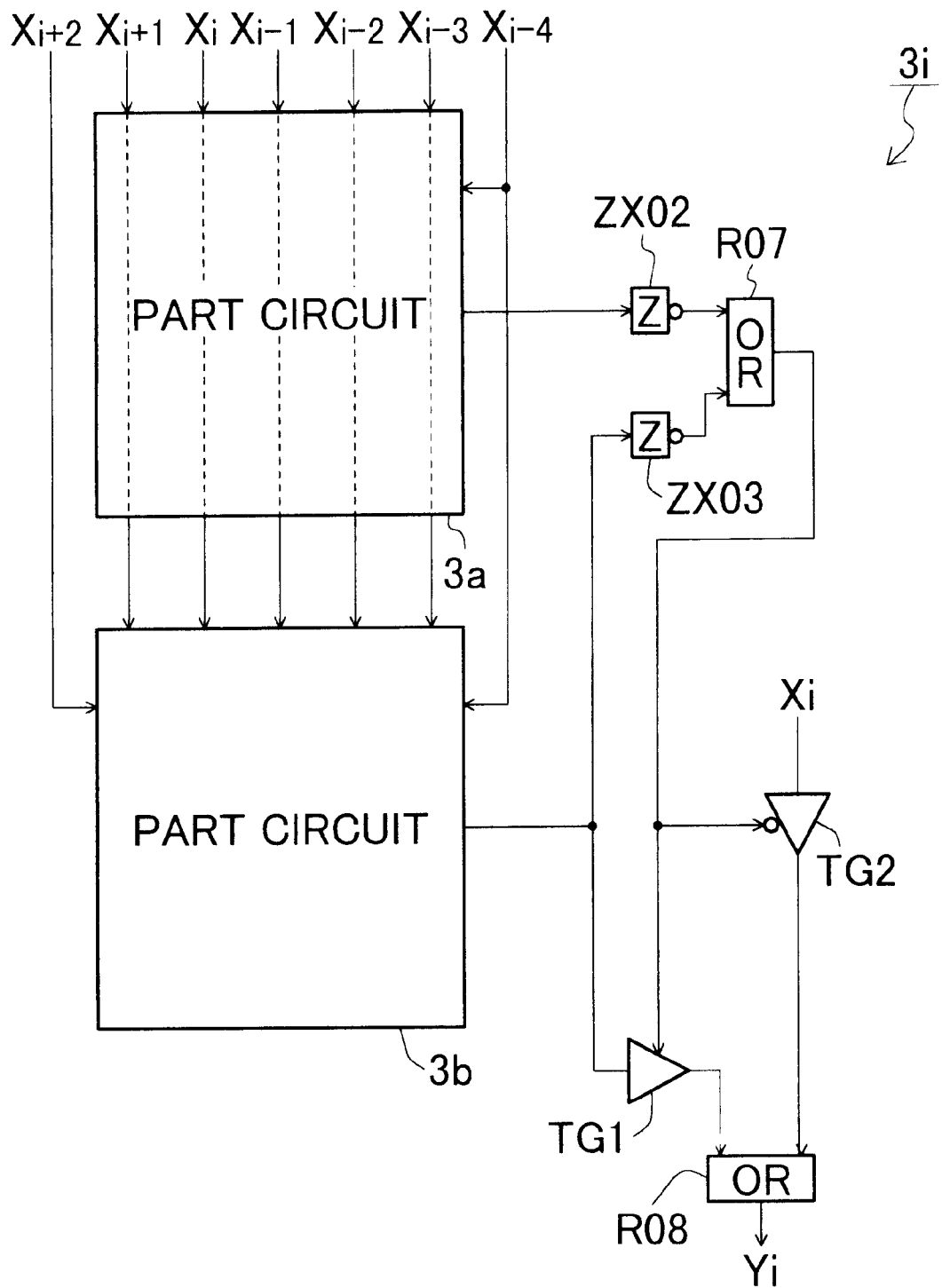
FIG. 3 is a circuit diagram embodying a decoder which constitutes the first RBC conversion circuit in FIG. 2.
Figure 4:
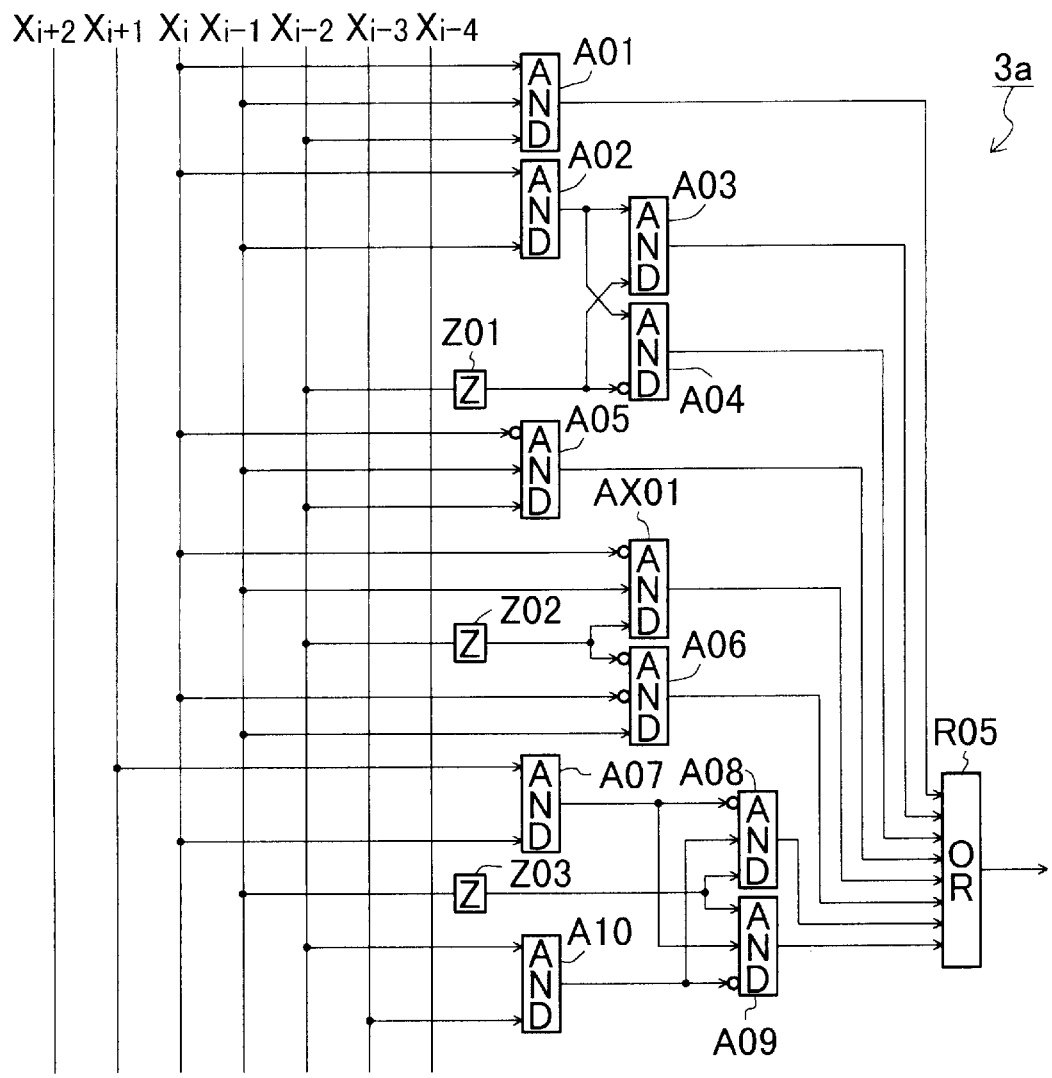
FIG. 4 is a circuit diagram embodying a part circuit 3a in FIG. 3.
Figure 5:
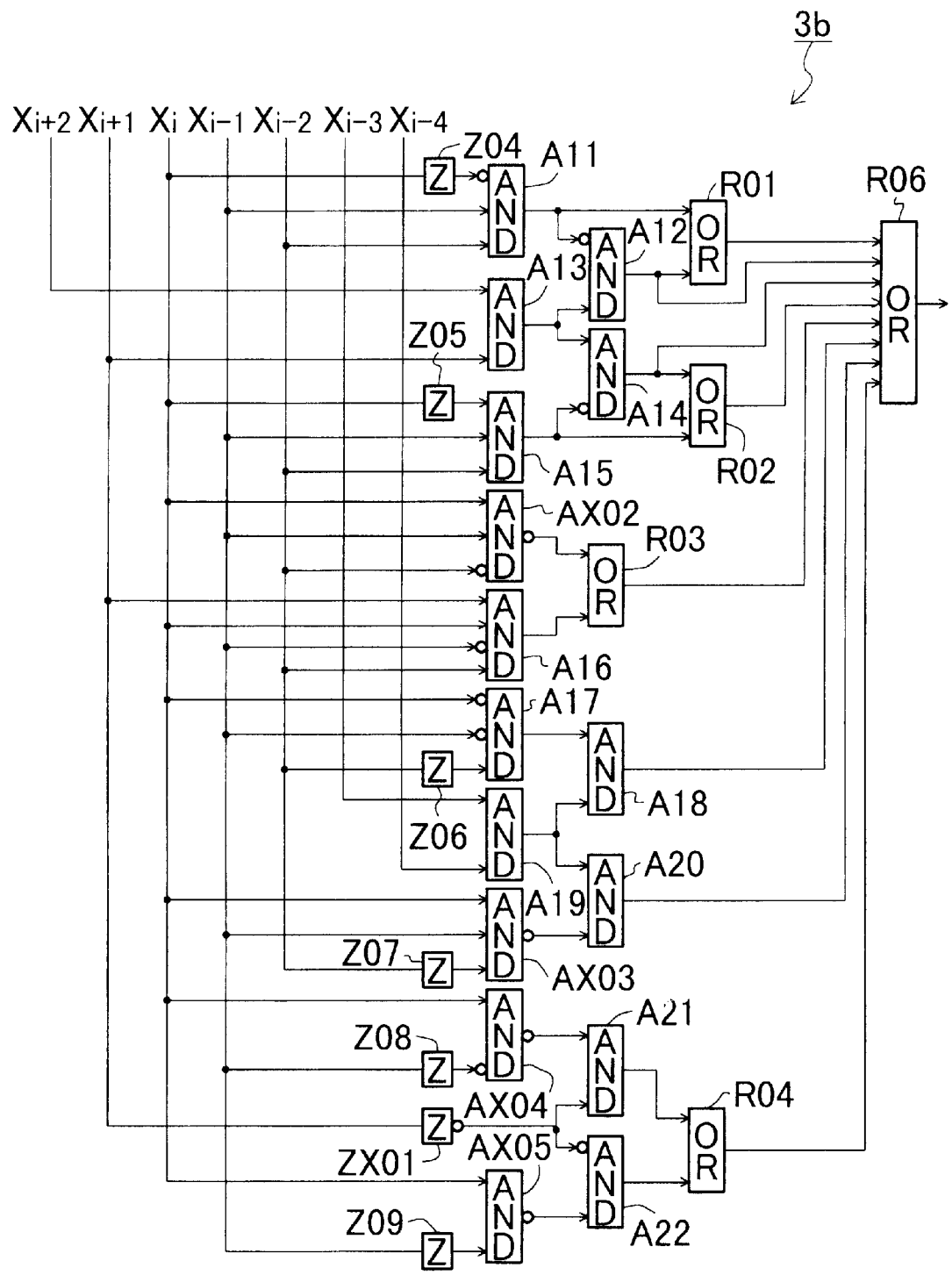
FIG. 5 is a circuit diagram embodying part circuit 3b in FIG. 3.

FIG. 3 shows an embodiment of decoder 3i, where i∈{0 to n}, which constitutes the first RBC conversion circuit 261 in FIG. 2. FIG. 4 shows an embodiment of part circuit 3a in FIG. 3, and FIG. 5 shows an embodiment of part circuit 3b in FIG. 3. In FIGS. 3 to 5, A01 to A22 are AND gates, AX01 through AX05 are NAND gates, R01 through R08 are OR gates, Z01 through Z09 are zero detecting circuits, ZX01 through ZX03 are non-zero detecting circuits, and TG1 and TG2 are transfer gates.

These AND gates, NAND gates and OR gates are logic gates of ST (Symmetric Ternary), and the input and output characteristics of the basic gates are defined as follows:

AND gate:

If inputs are all '1', then the output is '1'

If inputs are all 'T', then the output is 'T'.

If inputs are other than the above, then the output is '0'.

OR gate:

If inputs are a combination of '1' and '0' or all '1', then the output is '1'.

If inputs are a combination of 'T' and '0' or all 'T', then the output is 'T'.

If inputs are other than the above, then the output is '0'.

INVERTER:

If input is '1', then the output is 'T'.

If input is 'T', then the output is '1'.

If input is '0', then the output is '0'.

In FIG. 3 to FIG. 5, the small circle mark o attached to the logic gate symble means negate of ST logic as in the case of binary logic.

The zero detecting circuit, non-zero detection circuit and transfer gate have non-ST logic at their outputs, which are defined as follows:

Zero detecting circuit:

If input is '0', then the output is '1'.

If input is '1' or 'T', then the output is '0'.

Non-zero detecting circuit:

If input is '1' or 'T', then the output is '1'.

If input is '0', then the output is '0'.

Transfer gate TG1:

If control input is '1', then (Output value)=(Input value)

If control input is '0', then the output is '0'.

Transfer gate TG2:

If control input is '0', then (Output value)=(Input value)

If control input is '1', then the output is '0'.

Firstly, a description will be given of the basic operation of the output stage of FIG. 3.

(1) When the output of part circuit 3a or 3b is not '0';

the output of non-zero detecting circuit ZX02 or ZX03 becomes '1' and the output of OR gate R07 becomes '1', and transfer gate TG1 is made to through state and the output of transfer gate TG2 becomes '0'. Therefore, output Yi of OR gate R08 is matched with the output of part circuit 3b which is the output of OR gate R06 in FIG. 5.

(2) When the outputs of both part circuits 3a and 3b are '0';

the outputs of non-zero detecting circuits ZX02 and ZX03 become '0' and the output of OR gate R07 becomes '0', and transfer gate TG2 is made to through state and the output of transfer gate TG1 becomes '0'. Therefore, output Yi of OR gate R08 is matched with input Xi of transfer gate TG2.

Part circuit 3a is the first group pattern detecting circuit, and if the input pattern is matched with one of the first group patterns, the output of part circuit 3a (output of OR gate R05) becomes '1' or 'T'. Part circuit 3b is the second group pattern detecting circuit, and if the input pattern is matched with one of the second group patterns each of which is not belonging to the first group patterns, the output of part circuit 3b (output of OR gate R06) becomes '1' or 'T'.

Since the circuit 3i is thus configured, in a case where part circuit 3a detects pattern-matching, which means that the input pattern is not one of the second group patterns, the output of part circuit 3b becomes '0' regardless of whether the output of part circuit 3b is '1' or 'T', and then Yi=0 according to the above-mentioned operation (1).

Therefore, the circuit for detecting a pattern which corresponds to Yi='0' on TABLE II may be incorporated into the first group pattern detecting circuit without taking into consideration whether the output of part circuit 3a is '1' or 'T'. Therefore, the circuit design can be simplified.

Next, a description will be given of operation of circuits of FIG. 3 through FIG. 5 with reference to TABLE II. Hereinafter, the output of a logic gate connected to the input of OR gate R05 or R06 will be called pattern detecting signal.

When the input is matched with the pattern of row No. 11 on TABLE II, the output of AND gate A01 becomes 'T', and the other pattern detecting signals become '0', thereby the output of OR gate R05 becomes 'T' and the output of OR gate R06 becomes '0'. According to the above-mentioned operation (1), Yi becomes '0'. Such operation are simply written as follows:

Row No. 11: A01 ='T' and the other pattern detecting signals are '0', then R05='T' and R06='0'→Yi='0'.

When the input is matched with the pattern which is one of row No. 12 to 84 on TABLE II, the operation is performed as follows. A description is firstly given of operation of Yi='0' and rows not having any priority. These rows belong to the above-mentioned first group pattern.

Row No. 84: A01='1' and the other pattern detecting signals are '0', then, R05='1' and R06='0'→Yi='0'.

Row No. 31: AX01='T' and the other pattern detecting signals are '0', then R05='T' and R06='0'→Yi='0'.

Row No. 63: A06='T' and the other pattern detecting signals are '0', then R05='T' and R06='0'→Yi='0'.

Row No. 32: A05='1' and the other pattern detecting signals are '0', then R05='1' and R06='0'→Yi='0'.

Row No. 62: A05='T' and the other pattern detecting signals are '0', then R05='T' and R06='0'→Yi='0'.

Next, a description will be given of operation of Yi='1' and rows having priority. When Yi='1', the input pattern belongs to the above-mentioned second group patterns.

Row No. 13: AX02='1' and the other pattern detecting signals are '0', then R05='0' and R06='1'→Yi='1'.

Row No. 82: AX02='T' and the other pattern detecting signals are '0', then R05='0' and R06='T'→Yi='T'.

Row No. 22: ZX01=AX04=A21=R04='1' and the other pattern detecting signals are '0', then R05='0' and R06='1'→Yi='1'.

Row No. 72: ZX01=1, AX05=A22=R04='T' and the other pattern detecting signals are '0', then R05='0' and R06='T'→Yi='T'.

Row No. 33: A16=R03='T' and the other pattern detecting signals are '0', then R05='1' and R06='T' Yi='T'.

Row No. 61: A16=R03='1' and the other pattern detecting signals are '0', then R05='0' and R06='1'→Yi='1'.

Next, a description will be given of operation of rows having priority.

Row No. 14: A17='1', A19='1', A18='1' and the other pattern detecting signals are '0', then R05='0' and R06='1'→Yi='1'.

Row No. 12: A17='1', A19≠'1' and A18='0', but A02='T', Z01='1', A04='T' and the other pattern detecting signals are '0', then R05='T' and R06='0'→Yi='0'.

Row No. 42: A13='1', A11='T', A12='1', R01='0' and the other pattern detecting signals are '0', then R05='0' and R06='1'→Yi='1'.

(In this case, because of R01='0', A12='1' take priority of A11='T')

Row No. 41: A13='0', A11='T', A12='0', R01='T' and the other pattern detecting signals are '0', then R05='0' and R06='T'→Yi='T'.

Row No. 51: A13='T', A15='', A14='T', R02='0' and the other pattern detecting signals are '0', then R05='0' and R06='T'→Yi='T'.

(In this case, because of R02='0', A14='T' take priority of A15='1')

Row No. 52: A13='0', A15='1', A14='0', R02='1' and the other pattern detecting signals are '0', then R05='0' and R06='1'→Yi='1'.

Row No. 71: A07='1', Z03='1', A10='T', A09='1' and the other pattern detecting signals are '0', then R05='1' and R06='0'→Yi='0'.

Row No. 73: A07='1', Z03='1', A10='T' and A08=A09='0', but ZX01='1', AX05=A22=R04='T' and the other pattern detecting signals are '0', then R05='0' and R06='T'→Yi='T'.

Row No. 81: AX03='T', A19='T', A20='T' and the other pattern detecting signals are '0', then R05='0' and R06='T'→Yi='T'.

Row No. 83: AX03='T', A19≠'T' and A20='0', but A02=Z01=A03='1' and the other pattern detecting signals are '0', then R05='1' and R06='0'→Yi='0'.

Figure 6A:
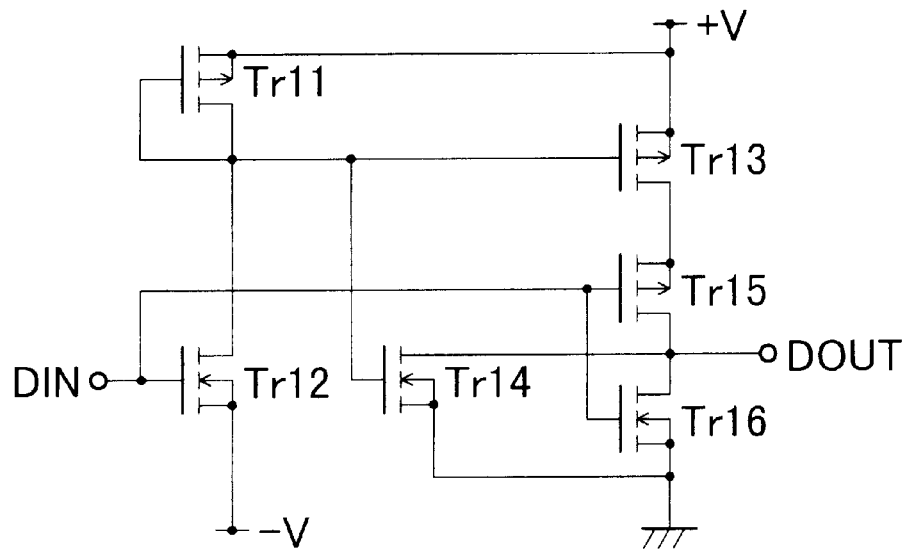
FIG. 6(A) is a circuit diagram embodying a zero detecting circuit in FIG. 4.

FIG. 6(A) shows an embodiment of the zero detecting circuit in FIG. 4 and FIG. 5.

Figure 6B:
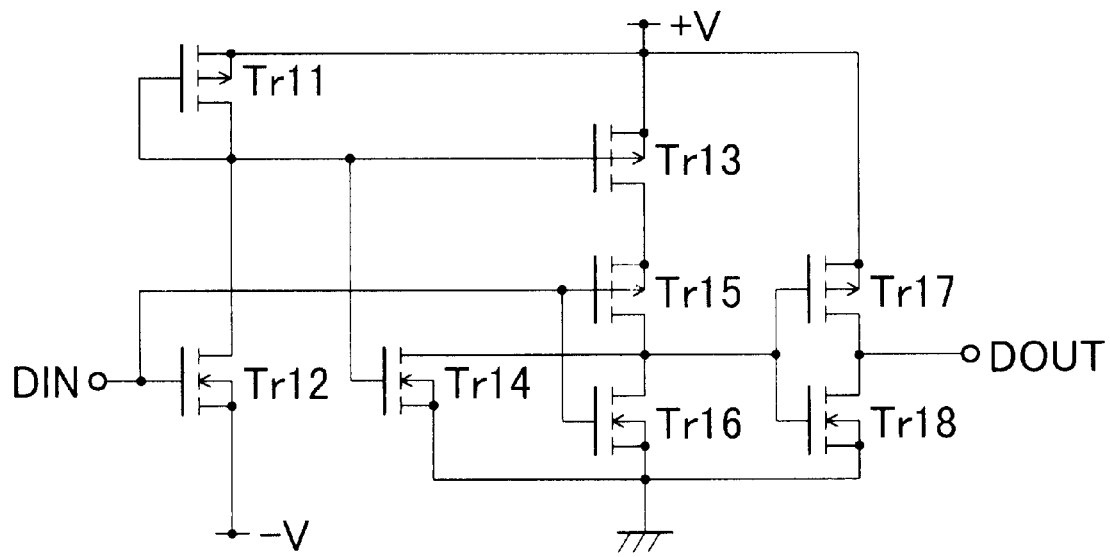
FIG. 6(B) is a circuit diagram embodying a non-zero detecting circuit in FIG. 3.
Figure 7:
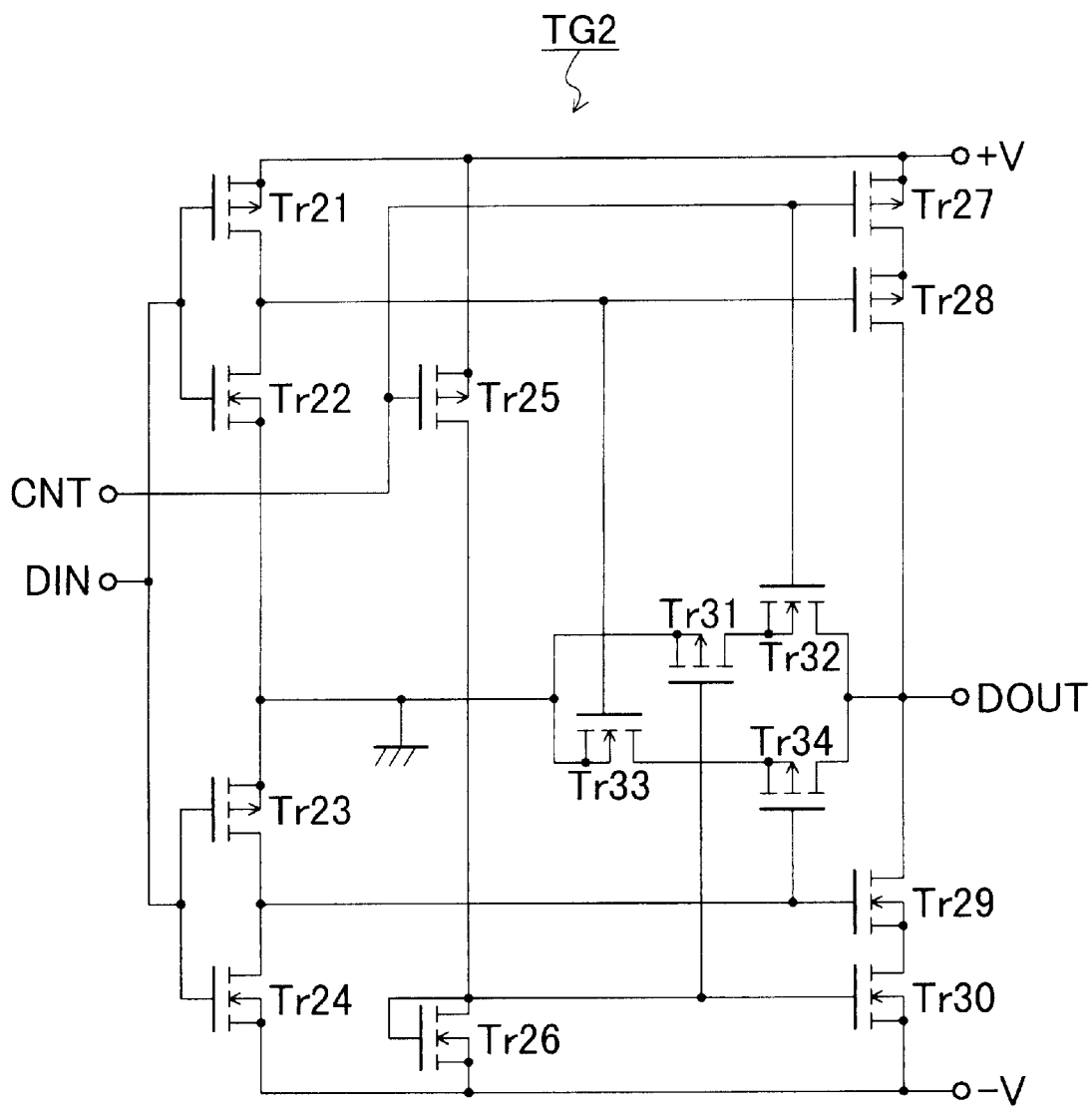
FIG. 7 is a circuit diagram embodying transfer gate TG2 in FIG. 3.
Figure 8:
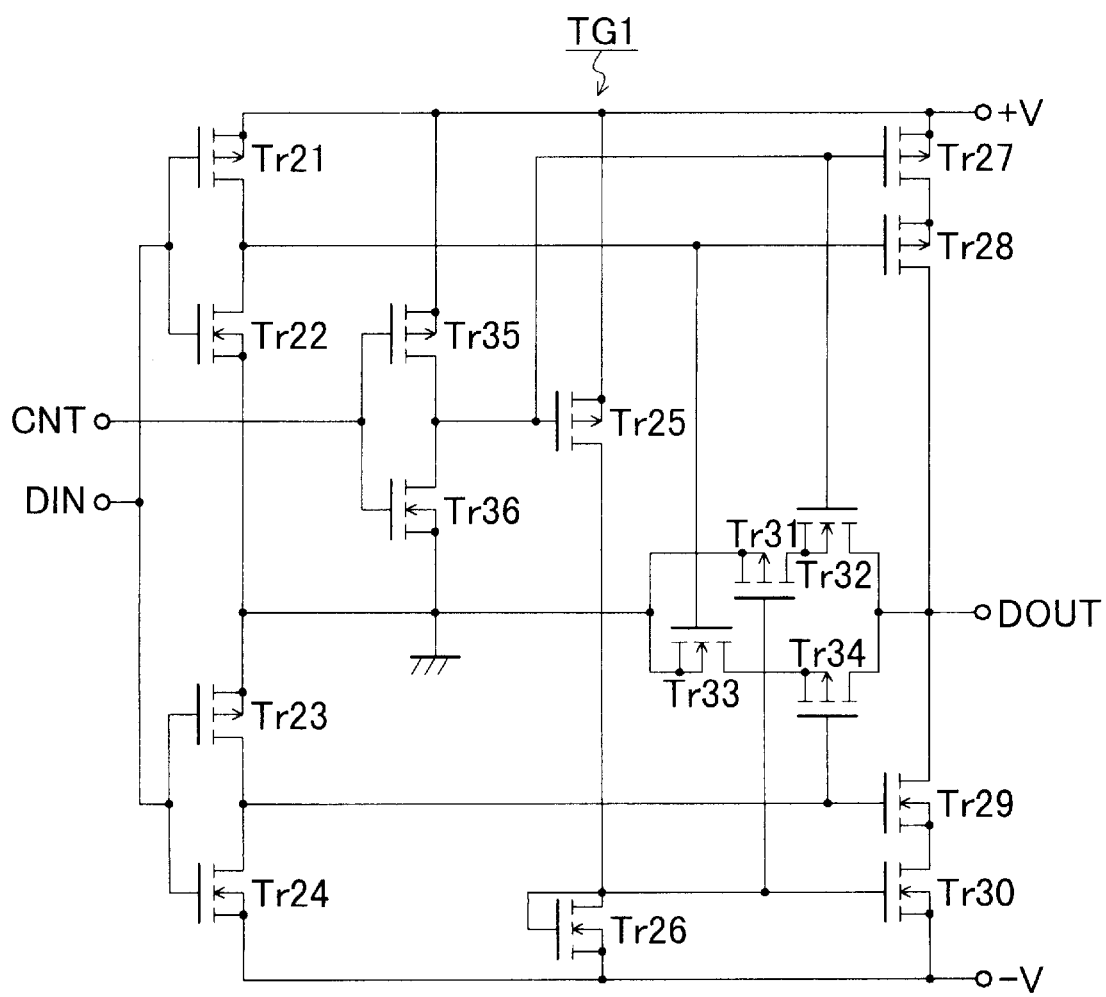
FIG. 8 is a circuit diagram embodying transfer gate TG1 in FIG. 3.

In this circuit, logic '1', '0' and 'T' respectively correspond to potential V, 0 and −V (This is the same as in FIG. 6(B), FIG. 7 and FIG. 8). In FIG. 6(A), transistors Tr11, Tr13 and Tr15 are PMOSFETs, and the remaining transistors Tr12, Tr14 and Tr16 are NMOSFETs.

When input DIN is '0', transistors Tr12, Tr13 and Tr15 are turned on and transistors Tr14 and Tr16 are turned off, thereby output DOUT becomes '1'.

When input DIN is 'T', transistors Tr12 and Tr16 are turned off and transistor Tr14 is turned on and transistor Tr13 is turned off, thereby output DOUT becomes '0'.

When input DIN is '1', transistors Tr12, Tr13 and Tr16 are turned on and transistors Tr14 and Tr15 are turned off, thereby output DOUT becomes '0'.

FIG. 6(B) shows an embodiment of the non-zero detecting circuit in FIG. 3 and FIG. 5.

In this circuit, a CMOS inverter consisting of PMOS transistor 17 and NMOS transistor 18 is further connected to the output stage of the circuit which is the same as that of FIG. 6(A).

FIG. 7 shows an embodiment of transfer gate TG2 in FIG. 3.

In FIG. 7, transistors Tr21, Tr23, Tr25, Tr27, Tr28, Tr31 and Tr34 are PMOSFETs, and the remaining transistors Tr22, Tr24, Tr26, Tr29, Tr30, Tr32 and Tr33 are NMOSFETs.

In a case of control input CNT is '0', transistors Tr25 and Tr27 are turned on, transistor Tr32 is turned off and transistors Tr30 and Tr31 are turned on.

In this case, when input DIN is '1', transistors Tr21 and Tr23 are turned off, transistors Tr22 and Tr24 are turned on, transistors Tr13, Tr29 and Tr33 are turned off, and transistor Tr28 is turned on, thereby output DOUT becomes '1'. When input DIN is '0', transistors Tr21 and Tr24 are turned on, transistors Tr22 and Tr23 are turned off, transistors Tr28 and Tr29 are turned off, and transistor Tr33 and 34 are turned on, thereby output DOUT becomes '0'. When input DIN is 'T', transistors Tr21 and Tr23 are turned on, transistors Tr22, Tr24 are turned off, transistor Tr28 and Tr34 are turned off, and transistors Tr29 and Tr30 are turned on, thereby output DOUT becomes 'T'.

In a case of control input CNT='1', transistors Tr27, Tr25 and Tr30 are turned off, and transistors Tr31 and Tr32 are turned on, thereby output DOUT becomes '0' regardless of the value of input DIN.

FIG. 8 shows an embodiment of transfer gate TG1 in FIG. 3.

In this circuit, the CMOS inverter consisting of PMOS transistor 35 and NMOS transistor 36 is further connected to the input stage at the control input side of the circuit which is the same as that of FIG. 7.

Figure 9:
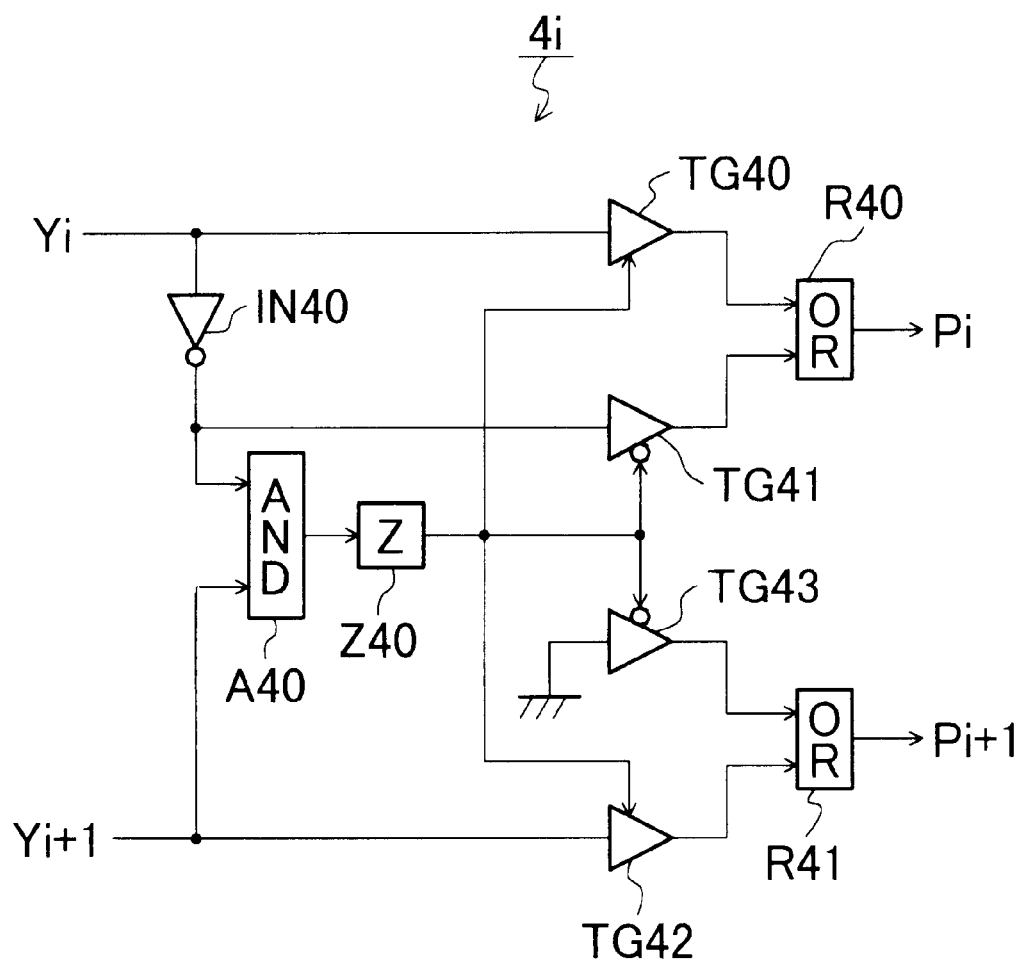
FIG. 9 is a circuit diagram embodying an RBC two-digit conversion circuit which constitutes the second RBC conversion circuit in FIG. 2.

FIG. 9 shows an embodiment of RBC 2-digit conversion circuit 4$i$ which constitutes the second RBC conversion circuit 262 in FIG. 2. AND gate, OR gates and inverter in the circuit are ST logic gate.

When Yi='1' and Yi+1='T', the output of inverter IN40 becomes 'T', the output of AND gate A40 becomes 'T', and the output of zero detecting circuit Z40 becomes '0', thereby transfer gates TG41 and TG43 are made to through state, and the outputs of transfer gates TG40 and TG42 become '0'. Since the outputs of transfer gates TG41 and TG43 are respectively 'T' and '0', the output Pi of OR gate R40 becomes 'T' and the output Pi+1 of OR gate R41 becomes '0'. Therefore, 'T' is converted to '0T'.

When the input Yi is 'T' and the input Yi+1 is '1', the output of inverter IN40 becomes '1', the output of AND gate A40 becomes '1', and the output of zero detecting circuit Z40 becomes '0', thereby transfer gates TG41 and TG43 are made to through state, and the outputs of transfer gates TG40 and TG42 become '0'. Since the outputs of transfer gates TG41 and TG43 are respectively '1' and '0', the output of OR gate R40 becomes Pi='1', and the output of OR gate R41 becomes Pi+1='0'. Therefore, '1T' is converted to '01'.

When the input Yi is '0' or the input Yi+1 is '0', the output of AND gate A40 becomes '0', and output of zero detecting circuit Z40 becomes '1', thereby transfer gates TG40 and TG42 are made to through state, and the outputs of transfer gates TG41 and TG43 become '0'. Therefore, Pi=Yi and Pi+1=Yi+1 are obtained. When Yi=Yi+1, the output of AND gate A40 becomes '0', thereby the same result as above can be obtained.

Figure 10:
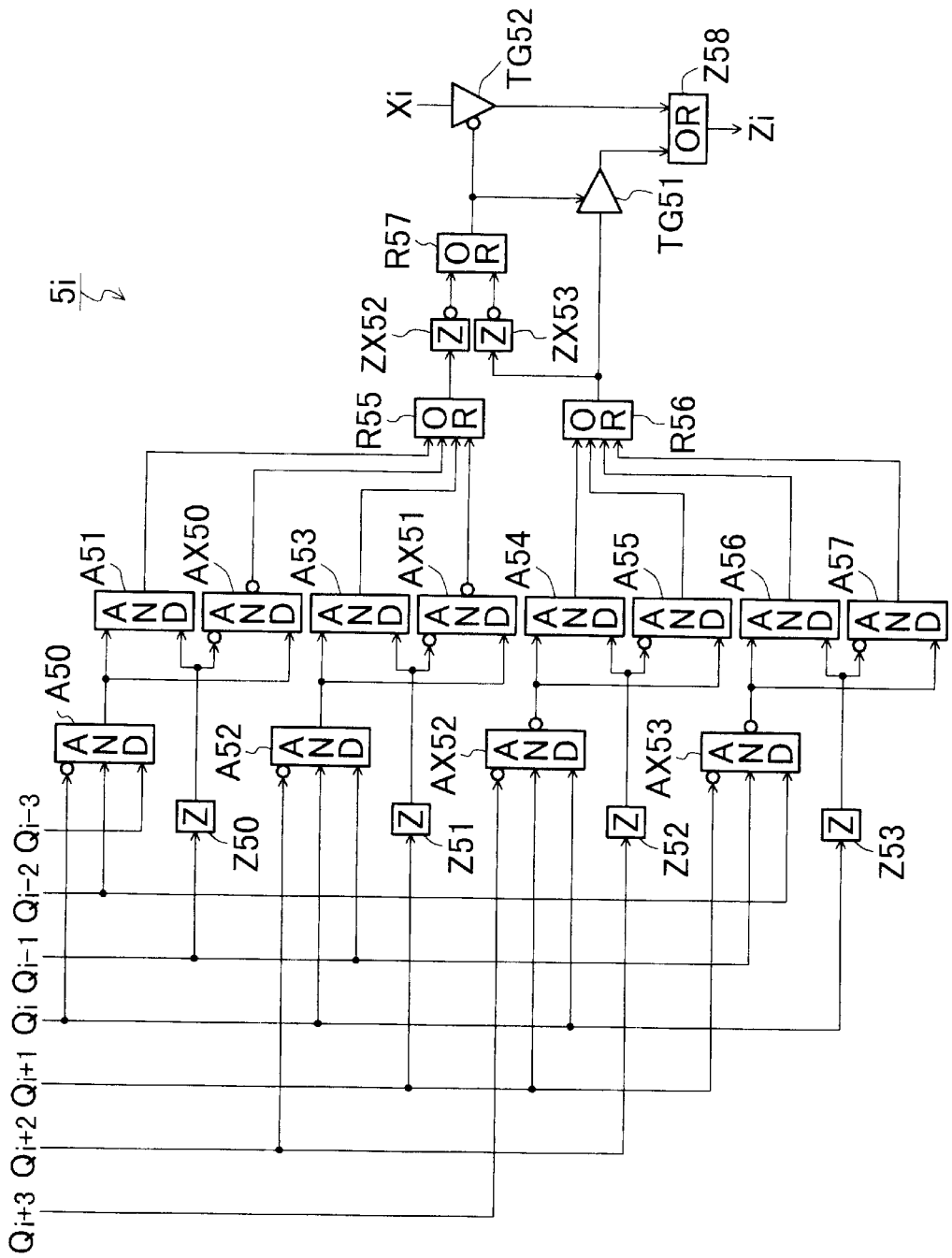
FIG. 10 is a circuit diagram embodying a decoder which constitutes the third RBC conversion circuit in FIG. 2.

FIG. 10 shows an embodiment of decoder 5i, where i∈{0 to n}, which constitutes the third RBC conversion circuit 263 in FIG. 2. AND gates and OR gates in the circuit are ST logic gates.

The circuit, at the output side, consisting of non-zero detecting circuits ZX52 and ZX53, transfer gates TG51 and TG52 and OR gates R57 and R58 is identical to the circuit, at the output side in FIG. 3, consisting of non-zero detecting circuit ZX02 and ZX03, transfer gates TG1 and TG2 and OR gates R07 and R08. Therefore, the above-mentioned operations (1) and (2) are performed.

The input side logic circuit of decoder 5i is one for detecting patterns on TABLE III, and the following operation are performed.

Row No. 1: AX52='T', Z52='1', A54='0', A55='1' and the other detecting patterns are '0', then R55='0' and R56='T'→Zi='T'.

Row No. 8: AX52='1', Z52='1', A54='1', A55='0' and the other detecting patterns are '0', then R55='1' and R56='1'→Zi='1'

Row No. 2: A52='1', Z51='1', A53='1', AX51='0' and the other detecting patterns are '0', then R55='1' and R56='0'→Zi='0'

Row No. 7: A52='T', Z51='1', A53='0', AX51='1' and the other detecting patterns are '0', then R55='1' and R56='0'→Zi='0'

Row No. 3: AX53='T', Z53='1', A56='0', A57='T' and the other detecting patterns are '0', then R55='0' and R56='T'→Zi='T'.

Row No. 6: AX53='1', Z53='1', A56='1', A57='0' and the other detecting patterns are '0', then R55='0' and R56='1'→Zi='1'

Row No. 4: A50='1', Z50='1', A51='1', AX50='0' and the other detecting patterns are '0', then R55='1' and R56='0→Zi='0'

Row No. 5: A50='T', Z50='1', A51='0', AX50='T' and the other detecting patterns are '0', then R55='T' and R56='0'→Zi='0'

Although preferred embodiment of the present invention has been described, it is to be understood that the invention is not limited thereto and that various changes and modifications may be made without departing from the spirit and scope of the invention. The present invention is characterized in a redundant binary code conversion circuit, and the circuit may be applied to various type multiplication circuits, for example, such a multiplication circuit that a multiplier and a multiplicand are floating point decimal numbers.

What is claimed is:

1. A redundant binary code conversion circuit for converting a redundant binary code of n digits to a redundant binary code of (n+1) digits without changing a value thereof, comprising:

a first code conversion circuit for converting a first redundant binary code 'Xn-1Xn-2...X2X1X0' of n digits to a second redundant binary code 'YnYn-1...Y2Y1Y0' of (n+1) digits according to a rule that value Yi of ith digit of said second redundant binary code is defined based on values Xi+1, Xi, Xi-1 and Xi-2 of (i+1)th to (i-1)th digits of said first redundant binary code and according to an exception of said rule that patterns ...TT011...' and '...110TT...' are changed to patterns '...T10T0T...' and '...1T0101....', respectively, 'T' being a digit of −1; and a second code conversion circuit for converting said second redundant binary code of (n+1) digits to a third redundant binary code of (n+1) digits so that patterns '...1T...' and '...T1...' are changed to patterns '...01...' and '...0T...', respectively.

2. A redundant binary code conversion circuit according to claim 1, wherein said rule in said first code conversion circuit, with using a formula f(Xi+1, Xi, Xi−1, Xi−2)=Yi, have relations of:

f(DC, 'T', 'T', DC)='0';
f(NZ, 'T', '0', DC)='1';
f(DC, 'T', '1', DC)='0';
f(DC, '0', 'T', 'T')='T';
f(DC, '0', '1', '1')='1';
f(DC, '1','T', DC)='0';
f(NZ, '1', '0', DC)='T';
f(DC, '1', '1', DC)='0'; and
in other case Xi=Yi, wherein value DC is don't care, value NZ is nonzero and Xj=0 for j≧n or j<0.

3. A redundant binary code conversion circuit according to claim 2, wherein, as other exception of said rule in said first code conversion circuit, patterns '...TT1...' and '...11T...' are changed to patterns '...T10T...' and '...1T01...', respectively.

4. A redundant binary code conversion circuit according to claim 3, wherein said rule and said exception in said first code conversion circuit, with using a formula f(Xi+2, Xi+1, Xi, Xi−1, Xi−2, Xi−3, Xi−4)=Yi, have unified relations of:

f(DC, DC, 'T', 'T', 'T', DC, DC)='0';
f(DC, DC, 'T', 'T', '0', DC, DC)='0';
f(DC, DC, 'T', 'T', '1', DC, DC)='1';
f(DC, DC, 'T', 'T', '0', '1', '1')='1';
f(DC, 'T', 'T', '0', DC, DC, DC)='1';
f(DC, '1', 'T', '0', DC, DC, DC)='1';
f(DC, 'T', 'T', '0', '1', '1', DC)='0';
f(DC, DC, 'T', '1', '0', DC, DC)='0';
f(DC, DC, 'T', '1', '1', DC, DC)='0';
f(DC, 'T', 'T', '1', 'T', DC, DC)='T';
f(DC, DC, '0', 'T', 'T', DC, DC)='T';
f('1', '1', '0', 'T', 'T', DC, DC)='1';
f('T', 'T', 'T', '1', '1', DC, DC)='T';
f(DC, DC, '0', '1', '1', DC, DC)='1';
f(DC, '1', '1', 'T', '1', DC, DC)='1';
f(DC, DC, '1', 'T', 'T', DC, DC)='0';
f(DC, DC, '1', 'T', '0', DC, DC)='0';
f(DC, '1', '1', '0', 'T', 'T', DC)='0';
f(DC, 'T', '1', '0', DC, DC, DC)='T';
f(DC, '1', '1', '0', DC, DC, DC)='T';
f(DC, DC, '1', '1', '0', 'T', 'T')='T';
f(DC, DC, '1', '1', 'T', DC, DC)='T';
f(DC, DC, '1', '1', '0', DC, DC)='0';
f(DC, DC, '1', '1', '1', DC, DC)='0'; and
in other case Xi =Yi, wherein, when there are a plurality of matches, a relation having a smaller number of DC is applied, and Xj=0 for j≧n or j<0.

5. A redundant binary code conversion circuit according to claim 4, wherein said first code conversion circuit comprises decoder circuits, and wherein each of said decoder circuits meets said unified relations and corresponds to one of i=0 through n.

6. A redundant binary code conversion circuit according to claim 5, wherein said second code conversion circuit comprises RBC two-digit conversion circuits of n/2 in number, and wherein each of said RBC two-digit conversion circuits receives two adjacent digits of said 'YnYn−1...Y2Y1Y0' and converts patterns '1T', 'T1' and others to patterns '01', '0T' and the same, respectively.

7. A redundant binary code conversion circuit according to claim 6, wherein said second binary code conversion circuit further comprises a RBC two-digit conversion circuit which receives outputs of adjacent two of said RBC two-digit conversion circuits and converts patterns '1T', 'T1' and others to patterns '01', '0T' and the same, respectively.

8. A redundant binary code conversion circuit according to claim 7, further comprising a third code conversion circuit for converting said second redundant binary code to a third redundant binary code of (n+1) digits so that patterns '...10TT...' and '...T011...' are changed to patterns '...0101...' and '...0T0T...', respectively.

9. A redundant binary code conversion circuit according to claim 8, wherein said third code conversion circuits converts said second redundant binary code 'QnQn−1...Q2Q1Q0' to said third redundant binary codes 'ZnZn−1...Z2Z1Z0' according to a rule that, with using a formula $g(Q_{i+3}, Q_{i+2}, Q_{i+1}, Q_i, Q_{i-1}, Q_{i-2}, Q_{i-3})=Z_i$, ith digit $Z_i$ of said third redundant binary code is defined by the Q/Z relations of:

g('T', '0', '1', '1', DC, DC, DC)='T';
g(DC, 'T', '0', '1', '1', DC, DC)='0';
g(DC, DC, 'T', '0', '1', '1', DC)='T';
g(DC, DC, DC, 'T', '0', '1', '1')='0';
g(DC, DC, DC, '1', '0', 'T', 'T')='0';
g(DC, DC, '1', '0', 'T', 'T', DC)='1';
g(DC, '1', '0', 'T', 'T', DC, DC)='0';
g('1', '0', 'T', 'T', DC, DC, DC)='1'; and in other case $Q_i=Z_i$, wherein $Q_j=0$ for $j \geq n$ or $j<0$.

10. A redundant binary code conversion circuit according to claim 9, wherein said third code conversion circuit comprises Q/Z decoder circuits for each of i=0 through n, and wherein each of said Q/Z decoder circuits meets said Q/Z relations.

11. A redundant binary code conversion circuit according to claim 5, wherein said decoder circuit comprises:

a first group pattern detecting circuit for detecting a match between an input pattern and one of first group patterns;

a second group pattern detecting circuit for detecting a match between said input pattern and one of second group patterns which don't overlap with said first group patterns; and an output selecting circuit for outputting a value corresponding to an output of said second group pattern detecting circuit when said match is detected by said first or second group pattern detecting circuit, and for outputting a value of an input digit corresponding to an output digit when said match is not detected.

12. A redundant binary code conversion circuit according to claim 10, wherein said Q/Z decoder circuit comprises:

a first group pattern detecting circuit for detecting a match between an input pattern and one of first group patterns;

a second group pattern detecting circuit for detecting a match between said input pattern and one of second group patterns which don't overlap with said first group patterns; and an output selecting circuit for outputting a value corresponding to an output of said second group pattern detecting circuit when said match is detected by said first or second group pattern detecting circuit, and for outputting a value of an input digit corresponding to an output digit when said match is not detected.

13. A redundant binary code multiplication circuit comprising:

a redundant binary code conversion circuit for converting a redundant binary code multiplier of n digits to a redundant binary code multiplier of (n+1) digits without changing a value thereof; and a circuit for calculating a total sum of partial products each of which corresponds to a nonzero digit of said redundant binary code multiplier of (n+1) digits, wherein said redundant binary code conversion circuit comprising:

a first code conversion circuit for converting a first redundant binary code 'Xn−1Xn−2... X2X1X0' of n digits to a second redundant binary code 'YnYn−1...Y2Y1Y0' of (n+1) dig its ac cording to a rule that, value $Y_i$ of ith digit of said second redundant binary code is defined based on values $X_{i+1}$, $X_i$, $X_{i-1}$ and $X_{i-2}$ of (i+1)th to (i−1)th digits of said first redundant binary code and according to an exception of said rule that patterns '...TT011...' and '...110TT...' are changed to patterns '...T10T0T...' and '...1T0101...', respectively, 'T' being a digit of −1; and a second code conversion circuit for converting said second redundant binary code of (n+1) digits to a third redundant binary code of (n+1) digits so that patterns '...1T...' and '...T1...' are changed to patterns '...01...' and '...0T...', respectively.

* * * * *